United States Patent
Ross et al.

[11] Patent Number: 6,010,632
[45] Date of Patent: Jan. 4, 2000

[54] HYDROTHERMAL OXIDATION OF ORGANIC COMPOUNDS WITH HETEROGENOUS NEUTRALIZING REAGENT

[75] Inventors: David S. Ross, Palo Alto; Indira Jayaweera, Fremont; David C. Bomberger, Belmont; Roald N. Leif, San Francisco, all of Calif.

[73] Assignee: SRI International, Menlo Park, Calif.

[21] Appl. No.: 09/069,892

[22] Filed: Apr. 29, 1998

Related U.S. Application Data

[63] Continuation-in-part of application No. PCT/US97/04443, Mar. 19, 1997, which is a continuation-in-part of application No. 08/632,604, Apr. 15, 1996, Pat. No. 5,746,926, which is a continuation-in-part of application No. 08/621,746, Mar. 22, 1996, Pat. No. 5,837,149.

[51] Int. Cl.[7] ......................................................... C02F 1/72
[52] U.S. Cl. ........................... 210/759; 210/760; 210/761; 210/909; 588/208; 588/218; 588/226; 588/239; 588/233
[58] Field of Search ..................................... 210/721, 761, 210/762, 759, 760, 752, 758, 908, 909, 915; 588/208, 218, 226, 233, 239

[56] References Cited

U.S. PATENT DOCUMENTS

| | | | |
|---|---|---|---|
| 4,543,190 | 9/1985 | Modell | 210/721 |
| 5,075,017 | 12/1991 | Hossain et al. | 210/761 |
| 5,409,617 | 4/1995 | Ross et al. | 210/762 |
| 5,492,634 | 2/1996 | Hong et al. | 210/761 |
| 5,543,057 | 8/1996 | Whiting et al. | 210/721 |
| 5,571,423 | 11/1996 | Daman | 210/761 |
| 5,746,926 | 5/1998 | Ross et al. | 210/761 |
| 5,755,974 | 5/1998 | McBrayer et al. | 210/739 |
| 5,777,192 | 7/1998 | Sako et al. | 588/208 |
| 5,837,149 | 11/1998 | Ross et al. | 210/759 |

FOREIGN PATENT DOCUMENTS

| | | |
|---|---|---|
| WO 93/00304 | 1/1993 | WIPO . |
| WO 95/19323 | 7/1995 | WIPO . |

OTHER PUBLICATIONS

International Search Report from related PCT Application No. US97/04443.
Bischoff, J., "Denise of Liquids and Vapors in Boiling NACL–H20 Solutions: A PVTX Summary From 300°–500° C," Am. J. of Science 291:309–338 (1991).
Caruana, C.M., "Supercritical Water Oxidation Aims for Wastewater Cleanup," Chemical Engineering Progress Supplement 2 91(4):10–18 (1995).
Database WPI, "Aminoacid treatment with liq. or supercritical carbon di:oxide to reduce mono– or di–chloro–propanol contamination levels," Section Ch, Week 9150, AN 91–364983.

*Primary Examiner*—Peter A. Hruskoci
*Attorney, Agent, or Firm*—LeeAnn Gorthey; Dehlinger & Associates

[57] ABSTRACT

A process for hot or supercritical water oxidative decomposition of wastes, particularly halogenated organic compounds, is described. The process employs a heterogeneous reagent which accelerates the decomposition and is effective to neutralize acidic byproducts. The reagent is maintained in suspension throughout the reaction by operating at conditions of temperature and pressure at which the heterogeneous reagent is largely or fully insoluble in water, and preferably at which liquid water is not present. Production of potentially corrosive brine is also minimized by operating at conditions under which sodium chloride is insoluble.

17 Claims, 3 Drawing Sheets

HYDROTHERMAL OXIDATION OF ORGANIC COMPOUNDS WITH HETEROGENOUS NEUTRALIZING REAGENT

Related Applications

This application is a continuation-in-part of PCT Application PCT/US97/04443, filed Mar. 19, 1997, which is a continuation-in-part of U.S. Ser. No. 08/632,604 filed Apr. 15, 1996, now U.S. Pat. No. 5,746,926, which is a continuation-in-part of 08/621,746, filed Mar. 22, 1997, now U.S. Pat. No. 5,837,149, all of which are incorporated by reference in their entirety.

REFERENCES

Bischoff, J., *J. Am. Chem. Soc.* 291:309–338 (1991).
Burleson, J. C., U.S. Pat. No. 4,564,458 (January 1986).
Hossain, S. V. et al., U.S. Pat. No. 5,075,017 (December 1991).
Jin, L. et al., "Catalytic Supercritical Water Oxidation of 1,4-Dichlorobenzene," *Chem. Eng. Sci.* 47:2659–2664 (1992).
Keevil, N., "Vapor Pressure of Aqueous Solutions at High Temperatures," *J. Am. Chem. Soc.* 64:841–850 (1942).
Meyer, J. et al., "Acetic Acid Oxidation and Hydrolysis in Supercritical Water," *AIChE Journal* 41: 2108–2121 (1995).
Modell, M. et al., U.S. Pat. No. 4,113,446 (September 1978).
Modell, M., U.S. Pat. No. 4,338,199 (July 1982).
Modell, M., U.S. Pat. No. 4,543,190 (September 1985).
Morey, G. et al., "Pressure-Temperature Curves in Some Systems Containing Water and a Salt," *J. Am. Chem. Soc.* 78:4249–4252 (1956).
Ross, D. S. et al., U.S. Pat. No. 5,409,617 (April 1995).
Savage, P. et al., *Envir. Sci. Technol.* 25: 1507–10 (1991).
Titmas, J. A., U.S. Pat. No. 4,594,164 (May 1985).
Whitlock, D. R., PCT Pubn. No. WO 81/00854 (April 1981).

FIELD OF THE INVENTION

The present invention relates to a process for the hot and supercritical water oxidation and decomposition of materials, such as hazardous wastes, particularly those including halogenated organic compounds.

BACKGROUND OF THE INVENTION

The U.S. chemical industry generates over a billion tons of hazardous waste each year, corresponding to about 4 tons of hazardous waste per ton of actual product. This waste includes about 600,000 tons of chlorinated waste, which, at present, is disposed of in certified incinerators. These incinerators are expensive to operate and are subject to increasing scrutiny regarding the environmental impact of the effluent gases produced.

There is also a great need for the safe destruction of chemical weapons, both in the U.S. and worldwide. It is estimated that 31,000 tons of mustard gas agents and nerve gas agents are stored around the United States, and plans for incineration of such materials have been met with public opposition.

Halogenated organic compounds, in general, pose a particular environmental threat. Such compounds occur infrequently in nature, and the carbon-halogen bond is generally resistant to natural decomposition methods. Incineration of these compounds is highly regulated and limited in the U.S. The products of such incineration, unless rigorously scrubbed, contribute to acid rain, and include chlorodioxins, which are highly toxic. One class of halocarbons, polyhalogenated biphenyls, are no longer produced in the U.S. and certain other countries, and methods for environmentally sound decomposition of these compounds is the subject of extensive research. Polychlorinated biphenyls (PCB's) and, polybrominated biphenyls (PBB's), long used as flame retardants in plastics and polymers, are highly resistant to decomposition by environmental forces and may enter the food chain with disastrous results.

A number of methods have been used to decompose hazardous or toxic materials such as these to products which are environmentally benign. Such practices include, for example, supercritical water oxidation (SCWO), wet air oxidation, incineration, molten salt oxidation, plasma are disposal, hydrothermal liquid oxidation, and molten metal pyrolysis. Studies of supercritical water oxidation include work by Hossain, Modell, Whitlock, Burleson, Titmas, Jin, Meyer, Ross, and Savage. Most of this work demonstrated a need to overcome slow reaction times, the severe reaction conditions of decomposition of materials, particularly halogenated organic compounds, and the attendant corrosion of the reaction equipment.

Co-owned applications U.S. Ser. No. 08/621,746 and Ser. No. 08/632,604, both allowed, describe a SCWO process which incorporates a heterogeneous reagent, preferably sodium carbonate, in the decomposition chamber. This process provides high reaction rates and conversions and minimizes corrosion of the reaction chambers. In some instances, however, it was found that the solid reagent tended to cake during reaction, thus reducing the reactive surface of the reagent. Thus, methods of maintaining the reagent as a dispersion throughout the reaction have been sought.

SUMMARY OF THE INVENTION

The present invention includes, in one aspect, a process for the decomposition of material selected from organic compounds, inorganic compounds, and combinations thereof. In accordance with the process, a solid specific reactant is heated, with agitation, in a reaction zone, in the absence of water, at conditions of temperature and pressure at which the reactant is at least about 90% insoluble in water. The specific reactant is effective to neutralize any acid gases produced in the decomposition. The reactant also activates the material towards decomposition reactions such as oxidation and pyrolysis.

Hot water is then added to the reaction zone. The water is also at conditions of temperature and pressure at which the reactant is at least about 90% insoluble, and thereby forms a heterogeneous mixture with said solid reactant. The mixture is then contacted, in the presence of a gaseous oxidant, with a feed mixture, comprising the material to be decomposed in an aqueous medium. This feed mixture is also introduced at such conditions of temperature and pressure. The contacting is carried out for a reaction time sufficient to convert about 99% or greater of the material to compounds which are environmentally acceptable, or which are amenable to further degradation by conventional disposal systems to environmentally acceptable products.

In a preferred embodiment, the specific reactant is essentially insoluble in water at the conditions of temperature and pressure employed. Preferably, these conditions include a temperature between about 300° C. and 600° C., and a pressure up to about 500 atmospheres. More preferably, reaction temperature is between about 374° C. and 400° C., and reaction pressures is between 1 and about 400 atmospheres.

The specific reactant is preferably selected from the group consisting of sodium carbonate, calcium carbonate, magnesium carbonate, sodium bicarbonate, calcium bicarbonate, magnesium bicarbonate, and combinations thereof; sodium carbonate is preferred. The gaseous oxidant is selected from the group consisting of air, oxygen, hydrogen peroxide, ozone and combinations thereof, and is preferably oxygen or air.

In one embodiment, useful when the material to be decomposed includes chlorinated compounds, the reaction temperature and reaction pressure of the decomposition (contacting) step are effective to maintain sodium chloride formed during the decomposition in the solid phase. The temperature is preferably between about 374° C. and 400° C. In one preferred embodiment, the reaction temperature is about 380° C., and the corresponding reaction pressure is less than about 150 atmospheres, typically between 1 and about 150 atmospheres.

These and other objects and features of the invention will become more fully apparent when the following detailed description of the invention is read in conjunction with the accompanying drawings.

DETAILED DESCRIPTION OF THE INVENTION

I. Definitions

Figure 1:
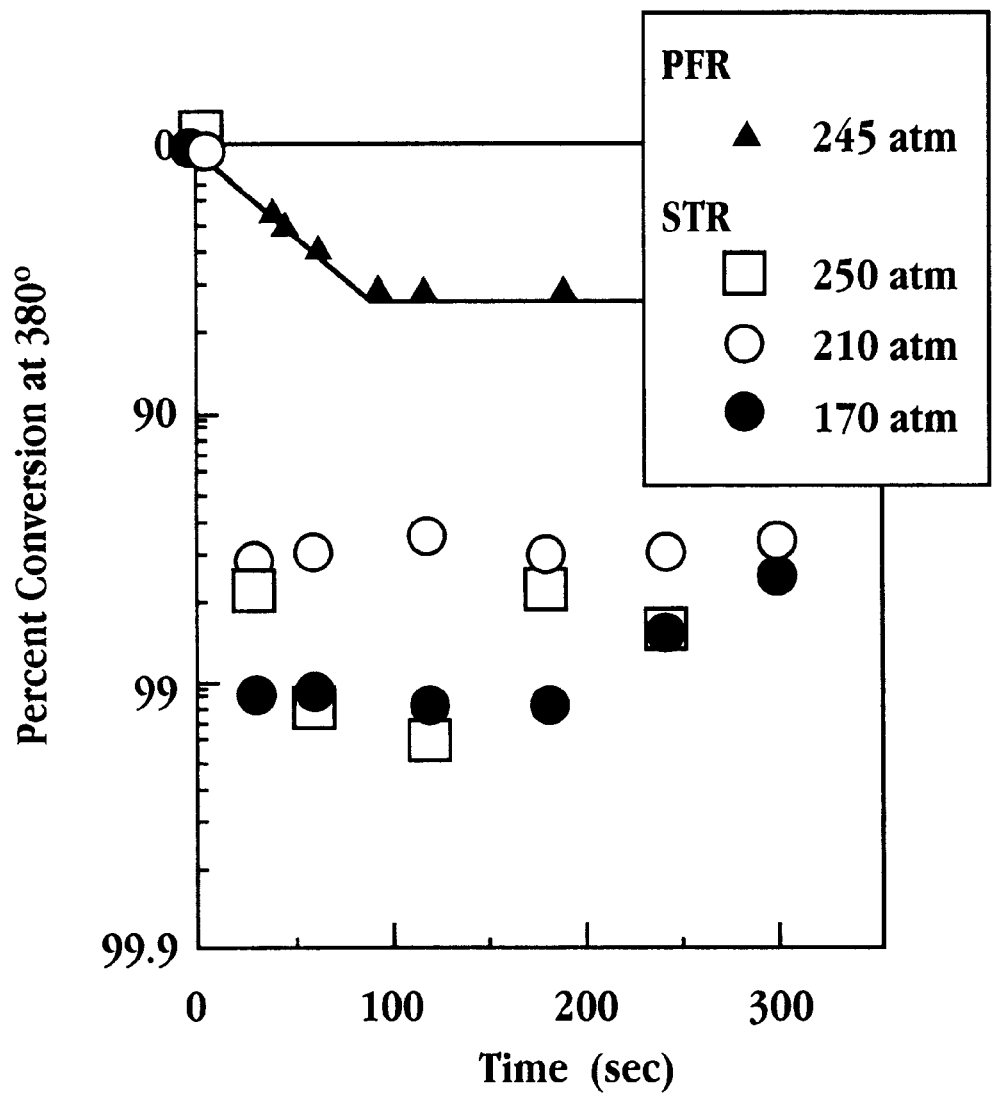
FIG. 1 shows conversions of dichlorobenzene in plug flow (PFR) and continuous stirred tank (STR) reactors, using solutions or slurries of sodium carbonate heated to supercritical conditions.

A "specific reactant" refers to an inorganic compound which is less than about 10% soluble, and preferably essentially insoluble, in water or an aqueous medium above the supercritical temperature of pure water (374° C.), and is effective to neutralize acidic gases produced during the decompositions described herein. Preferred specific reagents include, for example, sodium carbonate, calcium carbonate, calcium oxide, calcium hydroxide, magnesium oxide, magnesium hydroxide, and combinations thereof. Sodium carbonate is particularly preferred.

"Material" to be decomposed refers to organic, inorganic, and/or organometallic compounds, typically wastes or reaction by-products. The material particularly includes organic compounds having one or more atoms of halogen, nitrogen, sulfur, phosphorous, oxygen, and combinations thereof. Organic nitrogen compounds commonly required to be decomposed include, for example, aniline, nitrobenzene, nitrotoluene, dinitrotoluene, trinitrotoluene, nitroglycerin, pentaerythritol tetranitrate, and picric acid. Organic phosphorus compounds include phosphoric acids, alkyl phosphonates, and aryl phosphonates; organic sulfur compounds include sulfonic acids, alkyl mercaptans, $H_2S$, alkyl sulfates, and aryl sulfates. Halogenated compounds subject to decomposition as described herein include, for example, chlorobenzodioxins, polylbromobiphenyls, polychlorobiphenyls, polychlorinated benzenes, dichloromethane, chloroform, carbon tetrachloride, dichloroethylene, methyl bromide, ethyl bromide, dichlorofluoromethane, 1,2-dichloro-1,1,2,2-tetrafluoroethane, and combinations thereof.

II. Supercritical Water Oxidation Process

A hot/supercritical water oxidation process employing a heterogeneous specific reactant was first described in co-owned application U.S. Ser. No. 08/621,746. In this version of the process, an aqueous solution or slurry of the material to be decomposed was contacted with a reactive bed of a heterogeneous specific reactant, as defined above, present as a solid, in the presence of water and a gaseous oxidant. The decomposition was carried out under hot water or supercritical water oxidation conditions; i.e., at a temperature of between about 300° C. and 600° C., preferably in the range of 374° C. to 400° C., and a pressure between about 10 and 400 atmospheres.

In this earlier process, and in the modified processes described herein, the amount of specific reactant, which is preferably sodium carbonate, is preferably at least a stoichiometric amount relative to the waste stream. The amount of oxidant, preferably air or oxygen, is present in an amount sufficient to oxidize organic compounds to carbon dioxide and water, or to intermediates which are readily degraded by secondary disposal methods. More specifically, for complete reaction to $CO_2$, at least one molecule of oxygen is required for each carbon atom of the material to be decomposed. Depending on the feed material and the oxidant used, the active oxidant is typically present at between about 0.1 to 200 wt % of material present, preferably between about 0.1 to 100 wt %, and more preferably between 0.1 and 50 wt %. The reaction proceeds for a time sufficient to decompose about 99% or greater, and preferably 99.9% or greater, of the feed material. The product stream may then undergo a secondary disposal process; for example, it may be passed through a commercial oxidizer, e.g., a Thermatrix Flameless Oxidizer, available from Thermatrix, Inc. of San Jose, Calif. Typically, however, such secondary decomposition is not required.

The solubility behavior of the specific reactant is described in the co-owned applications cited above. While the majority of common salts, including sodium bromide, sodium iodide, sodium nitrate, and most potassium salts, including potassium carbonate, show an increase in aqueous solubility with increasing temperature, up to the critical point of water, the aqueous solubility of a specific reactant, as defined herein, rapidly decreases at these higher temperatures. The specific reactant is at least about 90% insoluble in water or an aqueous medium at 300° C., and becomes essentially insoluble in the aqueous medium at and above the critical temperature of pure water (374° C.). Salts which behave in this way include sodium carbonate, calcium oxide, calcium hydroxide, sodium sulfate, sodium fluoride, and sodium triphosphate. Those preferred for the present method also act as bases, that is, by reacting to neutralize any acid gas produced in the decomposition. These include sodium carbonate, calcium carbonate, magnesium carbonate, calcium oxide, calcium hydroxide, magnesium oxide, magnesium hydroxide, sodium bicarbonate, calcium bicarbonate, and magnesium bicarbonate.

In developing the earlier described process, reactions were first conducted in batch mode in small stainless steel reactors. The reactors were loaded with oxidant, feed, water, and specific reactant, e.g. sodium carbonate, and then heated to the desired temperature. These reactions gave substantially accelerated decomposition rates as compared to previously known methods, as well as high conversions, using substrates such as dichlorobenzene and polyhalogenated biphenyls. These results are described in co-owned, allowed application U.S. Ser. No. 08/632,604.

It was found, however, that, despite the low solubility of the specific reagent in the aqueous reaction medium at the reaction conditions employed, the reactant sometimes tended to cake as the reaction proceeded. This caking reduced the amount of reactive surface available, impeded stirring and mixing, and made cleaning of the reactor difficult.

To address this problem, reactions were conducted in a plug flow reactor (PFR), through which solutions of specific reactant were passed and heated to supercritical conditions prior to introduction of the substrate feed. Reactions were run at 380° C., at the pressures shown, with oxygen partial pressures of 0.5 to 1.2 atmospheres. Better results were obtained, though the conditions were still not optimal for larger scale, continuous production. For example, conversions of dichlorobenzene were often observed to reach about 75% within 90–100 seconds, and then to level off, as shown in FIG. 1 (filled triangles). It was suspected that this slowing of the reaction was again caused by a reduction of the active surface through caking or aggregation of the heterogeneous reactant in the presence of liquid water. Use of a continuous stirred tank reactor (STR), with continuous agitation, gave improved results, but surface-limiting processes still resulted in less than optimum conversions.

According to the present invention, further modifications to this procedure have been developed, effective to maintain the specific reactant throughout the process as a free-flowing, suspended material. The modified procedure is suitable for commercially practical systems such as continuous stirred-tank reactors, and gives excellent conversions.

According to the present invention, the following procedure is used. The solid specific reactant, in an amount effective to decompose the feed material under hot or supercritical water oxidation conditions, is placed in a suitable reaction zone, and, prior to addition of water or feed, the reactant is heated, with stirring, to the desired reaction temperature. The reaction zone is pressurized to the desired reaction pressure, e.g. with oxygen, air or an inert gas. As discussed above, the specific reactant is at least about 90% insoluble in water at the selected reaction temperature and pressure; preferably, it is essentially insoluble.

Hot water, also at a temperature and pressure at which the specific reactant is at least about 90% insoluble, and preferably essentially insoluble, is then added to the reaction zone, thereby forming a heterogeneous mixture with the reactant. This mixture is then contacted, in the presence of a gaseous oxidant, with a feed mixture, comprising the material to be decomposed in an aqueous medium, which is also at conditions of temperature and pressure as described above. This contacting is typically done by conveying the feed into the reaction zone. The decomposition is then carried out for a time sufficient to attain the desired conversion, preferably 99% or greater, and more preferably 99.9% or greater, of the feed materials to the desired more innocuous products.

According to an important aspect of the invention, when water contacts the specific reactant, both are at conditions of temperature and pressure at which the reactant is largely insoluble, and preferably fully insoluble, in water. Accordingly, the mixture remains heterogeneous at all stages; the specific reactant does not go into solution at any point during the process. Suitable temperatures range from about 300° C. to 600° C., with pressures up to a practical limit of about 500 atmospheres, as long as the conditions are effective to prevent dissolution of the specific reactant. Preferably, the conditions are also effective to maintain water in the gaseous state, to the exclusion of liquid, in the reaction zone.

Preferred reaction temperatures are between 370° C. and 400° C., and more preferably between 374° C. and 385° C. While a large range of pressures can typically be used at this temperature range, preferred pressures are between 1 and 400 atmospheres, and more preferably between about 100 and 200 atmospheres, as discussed further below. In general, suitable conditions of temperature and pressure can be readily determined from the known phase behavior of water and various aqueous salt solutions, or can be determined by a skilled practitioner using routine experimentation.

In decompositions run under these conditions, it was found that stirring could be conducted with little resistance. Upon completion of the runs, the aqueous phase was replaced with air, oxygen, or an inert gas, e.g. nitrogen, and the system was allowed to cool with continued stirring. When stirring was halted, at ambient conditions, the recovered carbonate was found to be a free-flowing, slightly granular material, rather than the caked material previously encountered.

Final conversions were much greater than obtained in the PFR (FIG. 1, circles and squares). Reaction rates were also significantly greater, with high conversions obtained within the 60 second period preceding the initial sampling.

Even with this substantial improvement in conversion, it was noted that conversions still leveled off at around 99%. While lower conversions were expected in the continuous reactors, as opposed to the batch processes conducted earlier, it was also suspected that this effect could be due to the formation of a mobile liquid brine (NaCl/water) a decomposition of the chlorinated substrate progressed. (As noted above, the critical behavior of a multicomponent aqueous solution varies from that of water. Although liquid water is not present at temperatures above 374° C., liquid brine can be present.) This brine could produce some caking of the reagent, as well as corrosion of the reactor surfaces.

Figure 2:
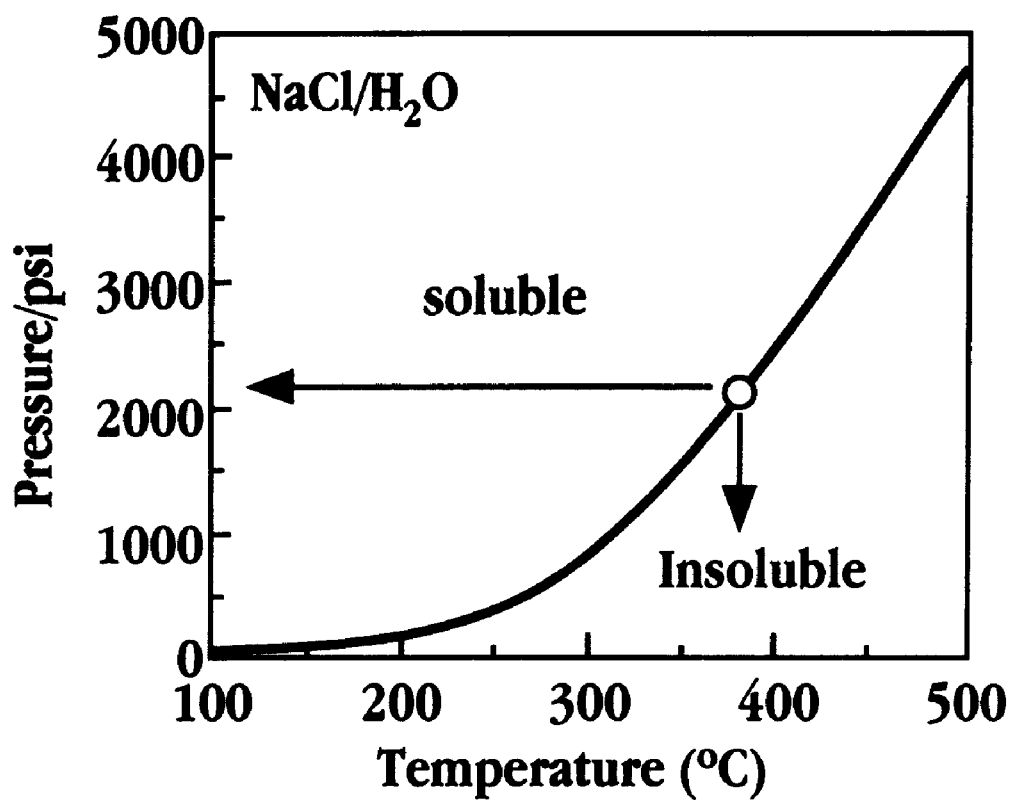
FIG. 2 is a phase diagram showing the solid/aqueous NaCl boundary in the NaCl/water system over a range of temperatures and pressures.

According to a further aspect of the invention, therefore, useful in the decomposition of feeds containing chlorinated compounds, particularly preferred combinations of temperature and pressure are those at which NaCl formed during the decomposition is maintained in the solid phase. The known phase behavior of sodium chloride solutions at various temperatures and pressures is illustrated in FIG. 2, adapted from Bischoff. As shown in the Figure, at a reaction temperature of, for example, 380° C., a pressure below about 2200 psi, or 150 atm (e.g., between 1 and about 150 atm) should be maintained to prevent dissolution of NaCl.

Figure 3A:
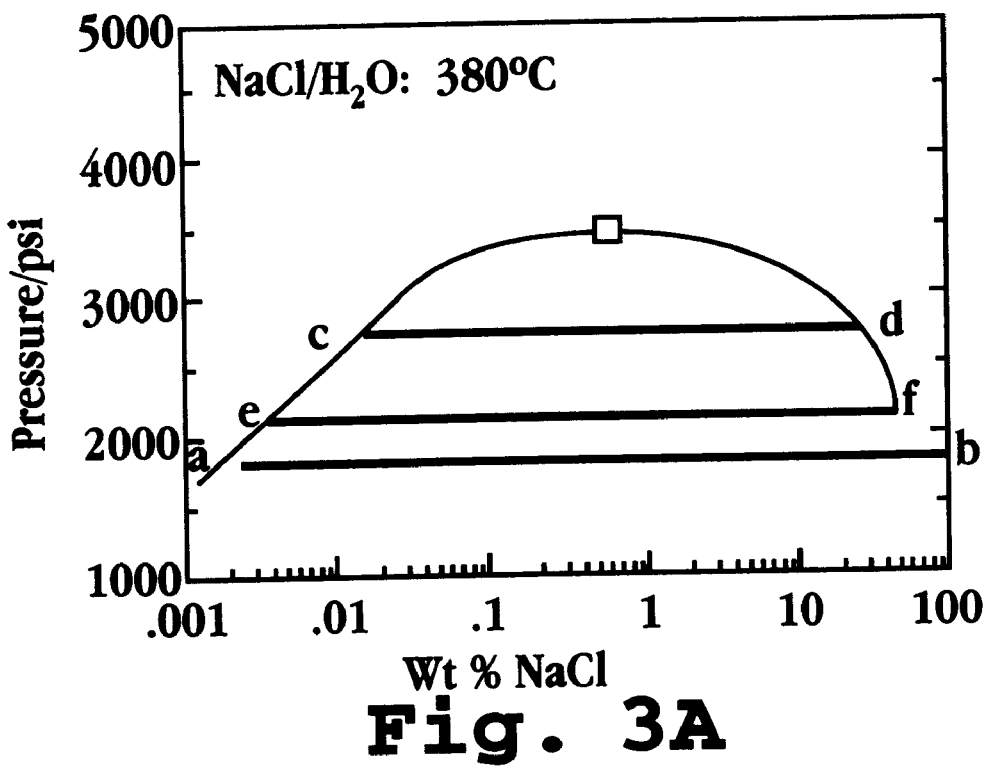
FIGS. 3A–3B are phase diagrams for the NaCl/water system at 380° C. and 400° C., respectively, at varying pressures.
Figure 3B:
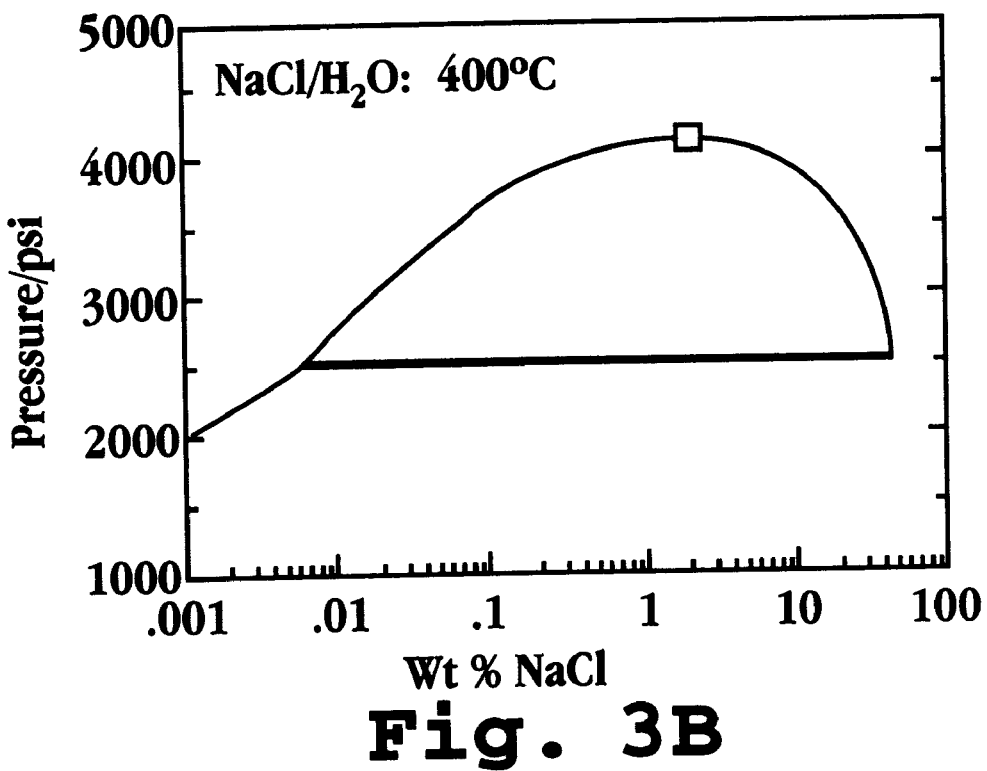

FIGS. 3A–3B show phase diagrams of the NaCl/water system at specific temperatures, 380° C. and 400° C., respectively. With reference to FIG. 3A, lines a-b and c-d are in two-phase regions separated by the three-phase line (e-f). Below this line, at pressures below about 2200 psi, is the gas-solid region. In this region, the solubility of NaCl is extremely low, and it exists essentially as a solid. On reaching the three-phase region, liquid brine begins to appear, and solid NaCl, brine, and gaseous water exist in equilibrium. At higher pressures, above the three-phase line, liquid brine and gaseous water coexist. FIG. 3B shows a similar phase diagram for 400° C., where the gas-solid region occupies pressures below about 2600 psi (about 177 atmospheres).

As noted above, an advantage of using the temperature/pressure combinations indicated is that generated NaCl exists as a solid in the reaction chamber, rather than as a mobile brine, thus greatly reducing corrosion of reactor surfaces, as well as preventing caking of the heterogeneous reactant. At higher pressures, where NaCl has some degree of solubility in water, the resulting brine may migrate from the solid reactant "bed" to other regions of the reactor. By using the preferred pressure/temperature combinations, however, the evolved NaCl forms on the solid carbonate surface, thus reducing exposure to reactor surfaces.

It is appreciated that the phase behavior of the mixtures employed in the decompositions described herein will vary to some degree from that of the pure $NaCl/H_2O$ systems illustrated. However, it is expected that data from the $NaCl/H_2O$ system will give sufficiently accurate estimates of suitable pressure/temperature combinations for these mixtures. In instances where the variation is significant, appropriate conditions of temperature and pressure, effective to maintain NaCl in solid form, may be determined by routine experimentation.

While the invention has been described with reference to specific methods and embodiments, it will be appreciated that various modifications may be made without departing from the invention.

It is claimed:

1. A process for the decomposition of material selected from organic compounds, inorganic compounds, and combinations thereof, which process comprises:
   (a) heating a solid specific reactant, with agitation, in a reaction zone, in the absence of water, at conditions of temperature and pressure at which the reactant is at least about 90% insoluble in water;
   wherein the specific reactant is effective to neutralize any acid gases produced in the decomposition;
   (b) adding hot water to the reaction zone, wherein said water is at conditions of temperature and pressure at which the specific reactant is a least about 90% insoluble, thereby forming a heterogeneous mixture of said solid reactant and water; and
   (c) contacting said mixture with a feed mixture, comprising the material to be decomposed in an aqueous medium, also at such conditions of temperature and pressure, in the presence of a gaseous oxidant,
   said contacting being carried out for a reaction time sufficient to convert about 99% or greater of the material to compounds which are environmentally acceptable, or which are amenable to further degradation to environmentally acceptable products.

2. The process of claim 1, wherein, at said conditions of temperature and pressure, the specific reactant is essentially insoluble in water.

3. The process of claim 1, wherein said conditions comprise a temperature between about 300° C. and 600° C., and a pressure between 1 and about 500 atmospheres.

4. The process of claim 3, wherein the temperature is between about 374° C. and 400° C.

5. The process of claim 3, wherein the pressure is between 1 and about 400 atmospheres.

6. The process of claim 5, wherein the pressure is between about 100 and about 200 atmospheres.

7. The process of claim 1, wherein the specific reactant is selected from the group consisting of sodium carbonate, calcium carbonate, magnesium carbonate, sodium bicarbonate, calcium bicarbonate, magnesium bicarbonate, and combinations thereof.

8. The process of claim 7, wherein the specific reactant is sodium carbonate.

9. The process of claim 1, wherein the gaseous oxidant is selected from the group consisting of air, oxygen, hydrogen peroxide, ozone and combinations thereof.

10. The process of claim 9, wherein the gaseous oxidant is oxygen or air.

11. The process of claim 1, wherein said material comprises chlorinated compounds, and said conditions of temperature and pressure in said contacting step (c) are effective to maintain sodium chloride formed during the decomposition in a solid phase.

12. The process of claim 11, wherein the temperature is between about 374° C. and 400° C.

13. The process of claim 11, wherein the temperature is about 380° C., and the pressure is less than about 150 atmospheres.

14. The process of claim 13, wherein the pressure is between 1 and about 150 atmospheres.

15. The process of claim 11, wherein said material to be decomposed comprises about 90 weight percent halogenated organic compounds.

16. The process of claim 15, wherein the halogenated organic compounds are polychlorobiphenyls.

17. The process of claim 1, further comprising the step of (d) further degrading the compounds produced in step (c) by subsequent reaction to environmentally acceptable products.

* * * * *